United States Patent [19]
Byers et al.

[11] Patent Number: 5,495,598
[45] Date of Patent: Feb. 27, 1996

[54] STUCK FAULT DETECTION FOR BRANCH INSTRUCTION CONDITION SIGNALS

[75] Inventors: Larry L. Byers, Apple Valley; Joseba M. De Subijana, Minneapolis; Wayne A. Michaelson, Circle Pines, all of Minn.

[73] Assignee: Unisys Corporation, Blue Bell, Pa.

[21] Appl. No.: 173,598

[22] Filed: Dec. 23, 1993

[51] Int. Cl.⁶ .......................... G06F 11/00; H03M 13/00
[52] U.S. Cl. ............................ 371/20.1; 371/55; 371/57.2
[58] Field of Search ....................................... 395/575, 375; 371/29.5, 55, 57.1, 61, 57.2

[56] References Cited

U.S. PATENT DOCUMENTS

| | | | |
|---|---|---|---|
| 4,308,616 | 12/1981 | Timoc | 37/23 |
| 4,800,564 | 1/1989 | Defazio | 371/61 |
| 4,813,044 | 3/1989 | Kumar | 371/55 |
| 4,852,093 | 7/1989 | Koeppe | 371/23 |
| 4,972,414 | 11/1990 | Borkenhagen | 371/22.3 |
| 5,018,144 | 5/1991 | Corr | 371/22.3 |

Primary Examiner—Robert W. Beausoliel, Jr.
Assistant Examiner—Ly V. Hua
Attorney, Agent, or Firm—Steven P. Skabrat; Charles A. Johnson; Mark T. Starr

[57] ABSTRACT

A method and apparatus for detecting stuck faults in a signal line used to communicate a branch condition for executing conditional branch instructions by a data processing system containing a programmable microprocessor and multiple VLSI gate arrays connected by a bi-directional bus, whereby the branch condition is obtained from a storage location resident on a VLSI gate array executing asynchronous and external to the microprocessor. The branch condition is fetched and evaluated in parallel with the fetching of the branch target address and the incrementing of the program counter. The microprocessor changes instruction sequence control depending on the results of the branch condition evaluation. The branch condition is sent to the microprocessor as a signal pulse for a specified duration at a particular time, rather than by changing the level of the signal, thereby allowing communication of the branch condition over only one signal line but still providing for detection of faults in the VSLI gate array or faults inherent in the signal line.

6 Claims, 16 Drawing Sheets

| FIG. 8A | FIG. 8B |
|---|---|
| FIG. 8C | FIG. 8D |

FIG. 8

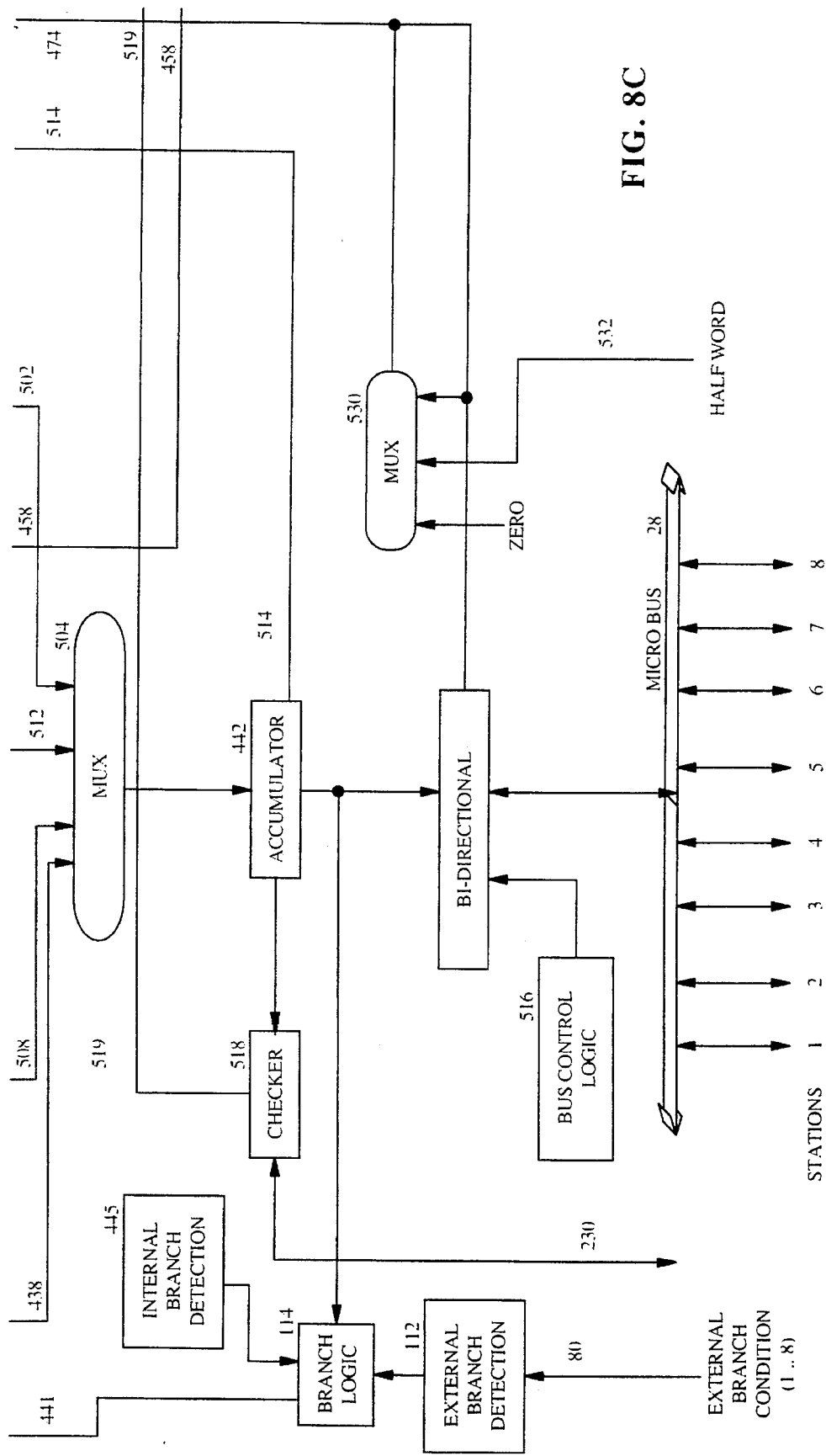

STUCK FAULT DETECTION FOR BRANCH INSTRUCTION CONDITION SIGNALS

CROSS REFERENCES TO RELATED APPLICATIONS

This application is related to the concurrently filed applications listed below, the disclosures of which are incorporated herein by reference. All of the listed applications are assigned to the same assignee as the present invention.

Microsequencer Bus Controller System Ser. No. 08/172,657, invented by Larry L. Byers, Joseba M. De Subijana, and Wayne A. Michaelson.

System And Method For Processing External Conditional Branch Instructions, Ser. No. 08/173,740, invented by Larry L. Byers, Joseba M. De Subijana, and Wayne A. Michaelson.

BACKGROUND OF THE INVENTION

1. Field of the Invention

This invention relates generally to the detection of faults in a digital computer system. More specifically, it relates to the detection of a "stuck" fault in a signal representing the value of the branch condition during the execution of a conditional branch instruction.

2. Background Information

The ability to make decisions by conditional branching is an essential requirement for any computer system which performs useful work. Conditional branch instructions may be used to construct such high-level programming constructs as loops and if-then-else statements. Because loops and if-then-else programming constructs are so common, it is essential that the conditional branch instructions which implement them execute as efficiently as possible.

The decision to branch or not to branch may be based on one or more events. In most computer systems these events are referred to as conditions and are represented as bits in a condition code (CC) register. Examples of conditions include positive, negative or zero numbers, overflow, underflow, and carry from the last arithmetic operation, and many others. When a CC register is used, the condition is tested by examining the relevant bits in the CC register, which were previously set by arithmetic/logical unit (ALU) operations. An advantage of this approach is that the condition bits are sometimes set without any negative effect on the time for executing instructions. A disadvantage is that condition codes constrain the ordering of instructions since they pass information from one instruction to an immediately following branch instruction. Nevertheless, this method is used by most prior art systems.

Some systems use the "compare and branch" approach. Under this approach, the compare is actually part of the branch instruction. Thus, two instructions (compare, branch) are now combined into one instruction, thereby potentially saving time. However, the set of conditions is often limited under this method and the actual implementation may be more complex and require just as much processing time as the two separate instructions.

A third approach is the use of a condition register to hold the value of the condition to be tested. This approach has the advantage being very simple. The disadvantage is that it uses up a register solely to store the condition. One way to eliminate this disadvantage is to store the condition in a register or designator on a device that is external to the processor. This approach will only be feasible if access to the external designator is obtained in an efficient and error-free manner.

There are two ways to quickly communicate the value of the external designator back to the processor, both of them involving signal lines. Since the external condition is a boolean value, two signal lines could be used to represent the possible values (i.e., one line for True, one line for False). Under this approach, both lines are initially set to a logic low state. During the processing of an external conditional branch instruction, the processor senses the state of each line. If the True line was set to a logic high, the processor knows that the branch condition is True. If the False line was set to a logic high, the processor knows that the branch condition is False. The True and False lines are then set to logic low after branch instruction processing is complete. It would be an error condition for both lines to be logic low or both lines to be logic high during an access. This would happen, for example, if the True line was stuck logic low and the branch condition was really true. The False line would then be logic low. Since both lines are logic low, the processor detects the stuck fault. A similar situation occurs when one of the lines is stuck logic high.

The problem with this approach is that it requires two lines to communicate a boolean value. It would be more efficient to be able to communicate the branch condition by using only one signal line. Thus, if the processor senses a logic high on the line, it would interpret the branch condition as True. If the processor senses a logic low on the line, it would interpret the branch condition as False. This approach saves pin connections because it uses only one line. However, if the line gets stuck at either a logic high or logic low state due to a hardware failure, the branch condition will always be represented as the same state, regardless of the actual value of the branch condition. When this occurs, the processor will at times branch or not branch instruction control erroneously and the stuck fault will escape detection. What is needed is an efficient method of communication over one signal line that detects this stuck fault condition before the error propagates throughout the system.

SUMMARY OF THE INVENTION

An object of this invention is to detect a stuck fault on a signal line used to communicate the branch condition during the execution of an external conditional branch instruction.

Another object of this invention is to communicate a branch condition to a processor executing a conditional branch instruction whereby the means of communication consists of only one signal line.

Additional objects, advantages and novel features of the invention will be set forth in part in the description which follows, and in pan will become apparent to those skilled in the art upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by a system and method for detecting a stuck fault condition during the execution of conditional branching instructions within a digital computer system. The branch condition to be evaluated during the processing of the conditional branch instruction is not set as a result of the execution of the immediately preceding instruction as in many prior art systems. Instead, the branch condition is set by the operation of a VLSI gate array (called a station) that is external to the microprocessor which is executing the conditional branch instruction. The VLSI gate array is executing asynchronously to the microprocessor. The branch condition is stored in one of many designators residing on a VLSI gate array. The state of a designator is accessed by the processor to determine whether a branch is to be taken or not to be taken. This access is accomplished by the sensing of the state of one signal line by the microprocessor. In parallel with the action to obtain the branch condition, the microprocessor obtains the branch target address from the conditional branch instruction and increments the program counter, thereby selecting the next sequential instruction to execute. If the result of the branch condition evaluation is that the branch is to be taken, the microprocessor loads the program counter with the branch target address, overwriting the address stored therein.

This unique branch instruction provides the capability to change instruction sequence control depending on a value resident in a device external to the microprocessor in a minimum amount of time. Furthermore, the value of the branch condition stored in the external device is obtained by sensing signal pulses on one line in such a way as to detect any stuck faults.

In accordance with an aspect of the invention, a method for communicating the state of a designator stored in an external device to a processor over a signal line, and for detecting stuck faults in the signal line, comprises providing a request from the processor to the external device to return the state of the designator. A signal is sent from the external device to the processor acknowledging receipt of the request. The state of the designator is then read by the external device. Next, a true condition pulse of a certain width is sent from the external device to the processor over the signal line, commencing a particular time after the sending of the acknowledgment signal if the state of the designator is true. A false condition pulse of a certain width is sent from the external device to the processor over the signal line, commencing a different amount of time after the sending of the acknowledgment signal if the state if the designator is false. The state of the signal line is sensed by the processor, commencing with the receipt of the acknowledgment signal for a duration of a particular length. Finally, the processor detects a true condition pulse, a false condition pulse, or the absence of a signal pulse during the: sensing time.

In accordance with another aspect of the invention, the system for communicating the state of a designator over a signal line and for the detection of stuck faults occurring in the signal line comprises a processor connected to an external device by a signal line. The processor includes circuitry to request the state of the selected designator and circuitry to detect signal pulses on the signal line and for interpreting the signal pulses as true or false states, or the absence of signal pulses as stuck faults. The external device includes circuitry to receive the request from the processor, circuitry to send an acknowledgment signal to the processor after receiving the request, circuitry to obtain the state of the selected designator, and circuitry to send a signal pulse representing the state of the designator to the processor over the signal line.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 8, comprising FIG. 8(A) through FIG. 8(D), is a detailed diagram illustrating the architecture of a Microsequencer Bus Controller.

DESCRIPTION OF THE PREFERRED EMBODIMENT

I. Microsequencer Bus Controller System Architecture

Figure 1:
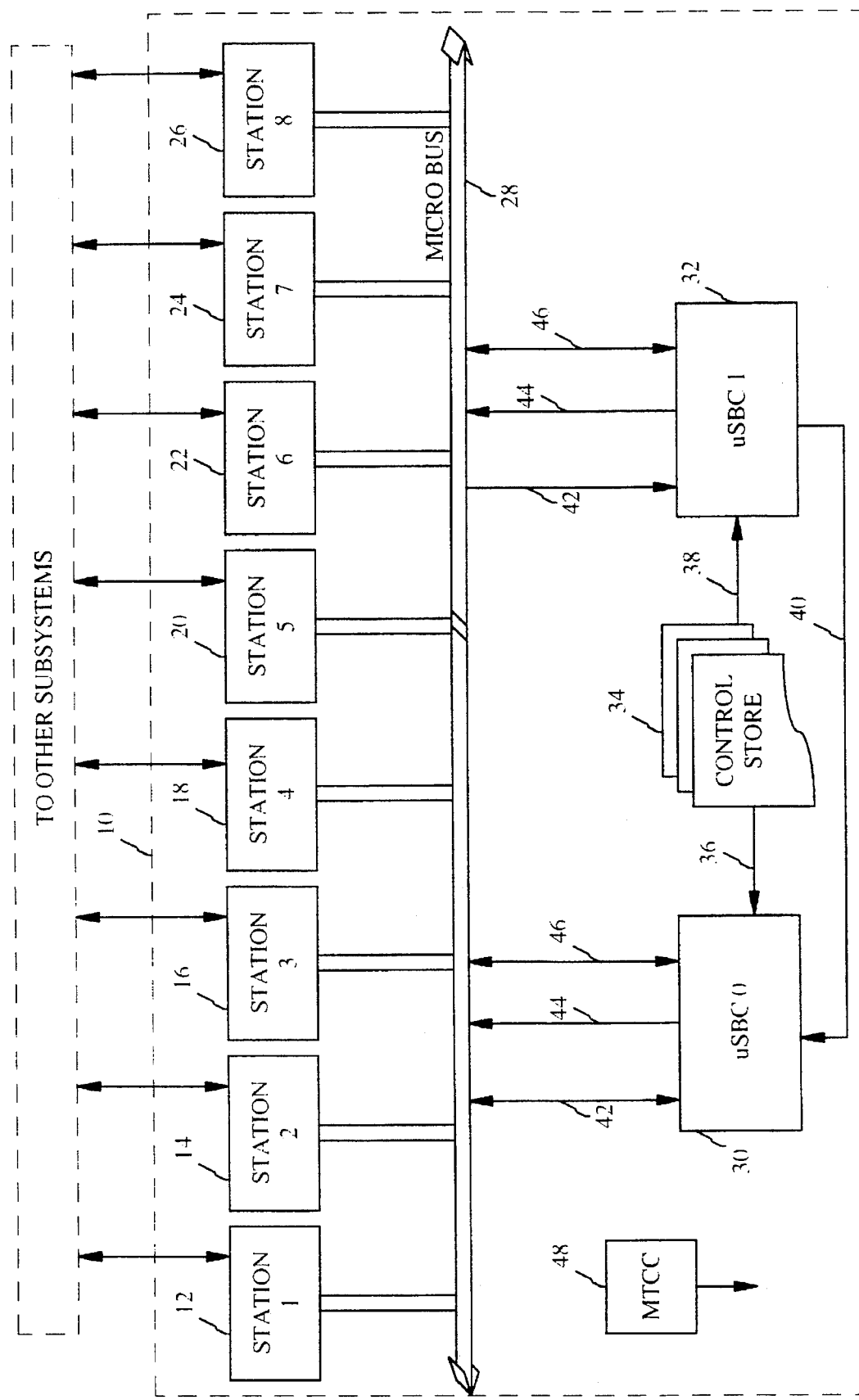
FIG. 1 illustrates the environment in which this invention operates.

FIG. 1 illustrates the environment in which this invention operates. The Microsequencer Bus Controller System provides the capability of flexible, microprocessor-based control of multiple gate arrays on a circuit card within a larger computer system. It is a flexible solution to the problem of controlling function-specific VLSI gate arrays on one circuit card because one or more gate arrays can be changed without any other changes in the Microsequencer Bus Controller System hardware. When a gate array is changed, a corresponding change to the program the microprocessors execute may easily be made.

The Microsequencer Bus Controller System 10 contains up to eight Stations 12, 14, 16, 18, 20, 22, 24, and 26 connected to a bi-directional internal communication bus called the Micro Bus 28. A Station is a collection of logic implemented in a gate array on a VLSI part produced with CMOS 448 technology that performs specific functions. A Station is coupled to the Micro Bus 28 and also may interface with another bus, I/O mechanism, or other subsystems that are external to the Microsequencer Bus Controller System. That is, it may read data from or write data to other hardware components in a larger computer system. In the preferred embodiment, there are ten different gate array designs representing Stations in the system. However, it is possible that any custom designed gate array supporting a set of required functions can fulfill the role of a Station and be connected to the Micro Bus 28. A Station contains multiple designators. A designator is a binary indicator, commonly implemented by a flip-flop, which indicates the current status of an event or function in the Station. Designators are considered "external" conditions because they exist on a device (the Station) that is external to the microprocessors.

The Micro Sequencer Bus Controller (uSBC) 0 30 and uSBC 1 32 are special purpose reduced instruction set (RISC) microprocessors that control the operation of the Stations via the Micro Bus 28. The uSBCs execute an instruction stream that is stored in the Control Store 34, a high speed static random access memory (SRAM). The instruction stream may contain conditional branch instructions where the branch condition is stored in a designator resident on one of the Stations. The instruction stream is written into the Control Store 34 at system initialization time. The instruction stream is fetched by uSBC 0 30 from the Control Store 34 over Line 36. The same instruction stream is fetched by uSBC 1 32 from the Control Store 34 over Line 38. The first microprocessor, uSBC 0 30, is the master, and the second microprocessor, uSBC 1 32, is the slave. The master and slave execute the same instructions at the same time, but only the master microprocessor writes data on the Micro Bus 28. Results of operations performed by the slave microprocessor uSBC 1 32 are forwarded over Line 40 to the master microprocessor uSBC 0 30, where they are compared with the results of operations performed by the master microprocessor uSBC 0 to detect any possible errors. The uSBCs connect to the Micro Bus 28 over three distinct sets of lines: Data Lines 42, Address Lines 44, and Control Lines 46.

The Micro Bus 28 is a bi-directional bus used by the uSBCs to communicate with the Stations and for data transfer between Stations. It provides access from a uSBC to hardware designators resident on a Station. The Maintenance Clock Control (MTCC) gate array 48 provides maintenance operations such as fault detection, clock distribution and control, and system reset/recovery for all components of the Microsequencer Bus Controller System 10. The MTCC interfaces with all Stations, the Micro Bus 28, and the uSBCs 30, 32.

II. The Micro Bus

The Micro Bus 28 is a bi-directional bus which provides communication paths between the uSBCs and the Stations. The Micro Bus consists of Data lines 42, Address lines 44, and various Control lines 46. The address portion of the bus is capable of addressing up to eight Stations. The Stations and the uSBCs transmit and receive data between themselves across the Micro Bus. The Micro Bus is adaptable to either a 36 bit data bus, or a 32 bit data bus. The mode of parity checking on the Micro Bus is different depending on whether the data bus is 36 bits or 32 bits.

The Micro Bus timing is defined in terms of the clock cycles it takes for the data transmitted on the bus to propagate from the transmitter to the receiver. This time is three machine clock cycles.

A. Bi-directional Signals

Figure 2:
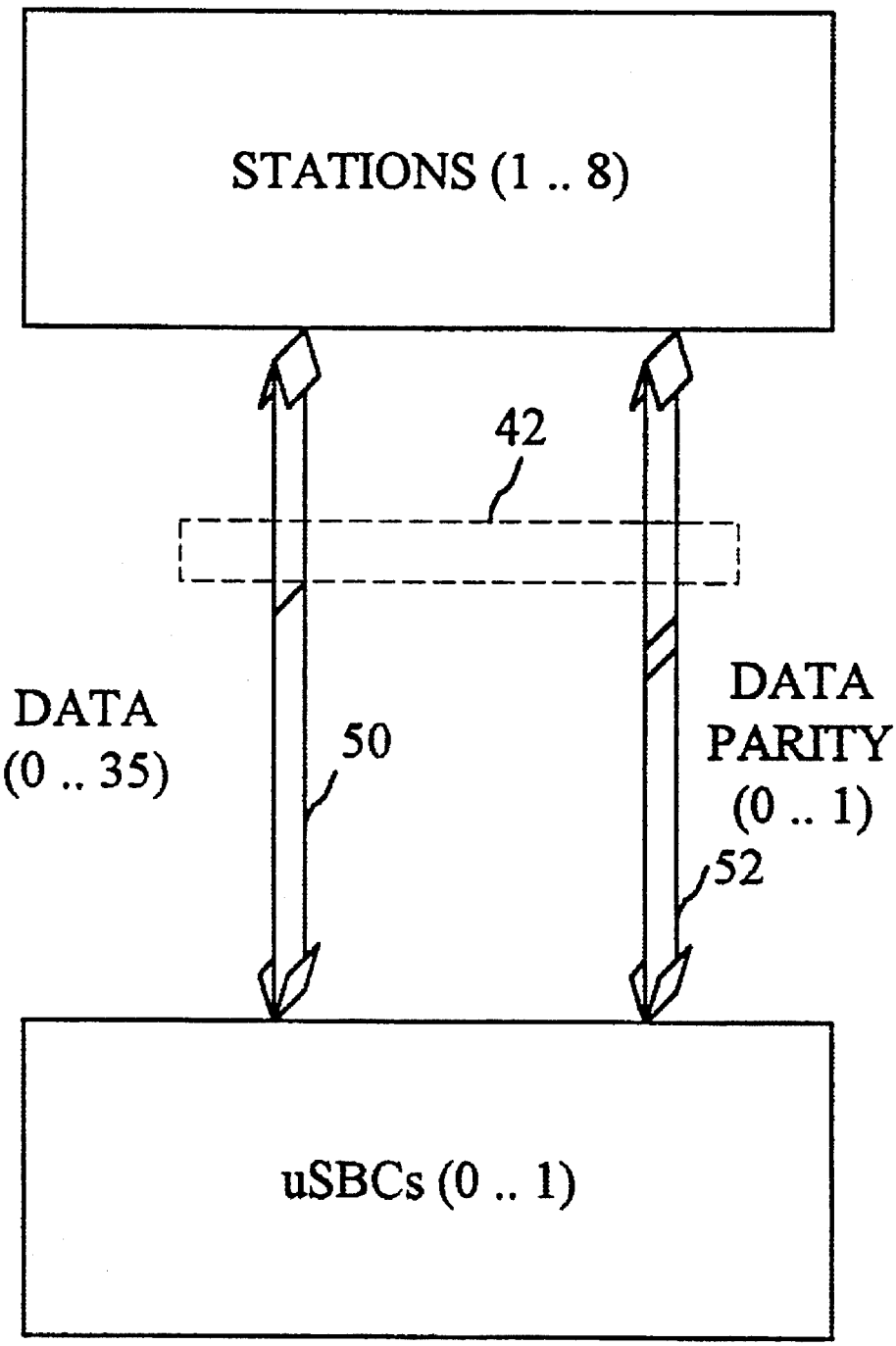
FIG. 2 is a block diagram illustrating the Data and Data Parity paths of the Micro Bus.

FIG. 2 is a block diagram illustrating the Data and Data Parity paths of the Micro Bus. The Data path 50 between the uSBCs 30, 32, and the Stations 12, 14, 16, 18, 20, 22, 24, and 26, consists of 36 bits. The Data Parity path 52 consists of two bits. Data 50 can be sent by uSBC 0 30 to a Station, and Data 50 can be received by both uSBC 0 30 and uSBC 1 32. Data Parity can be sent from a uSBC to a Station, or from a Station to a uSBC.

B. Signals From A uSBC To A Station

1. Address and Address Parity Signals

Figure 3:
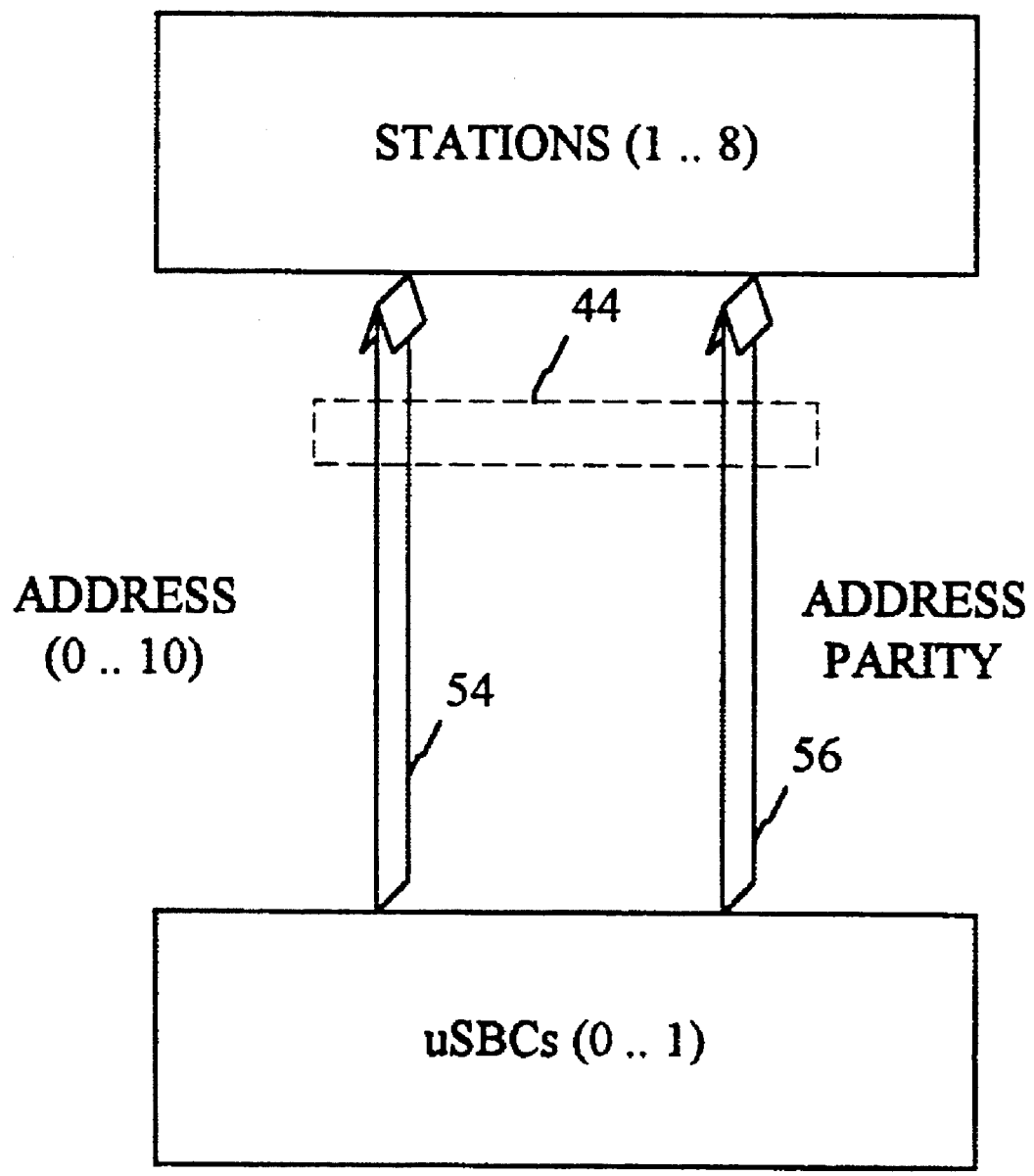
FIG. 3 is a block diagram illustrating the Address and Address Parity paths of the Micro Bus.

FIG. 3 is a block diagram illustrating the Address and Address Parity paths of the Micro Bus. Each uSBC can independently put 11 bits of Address 54 onto the Micro Bus 28 to select a Station and register or external designator from which to read data or write data. For bus driving reasons, each uSBC drives four Stations. USBC 0 30 drives the addresses for Stations 1, 2, 3, and 4, labelled 12, 14, 16, and 18, respectively, and uSBC 1 32 drives the addresses for stations 5, 6, 7, and 8, labelled 20, 22, 24, 26 respectively. An Address Parity bit 56 corresponding to each Address is also put onto the Micro Bus. This Address Parity bit represents the odd parity of the Address 54.

Figure 4:
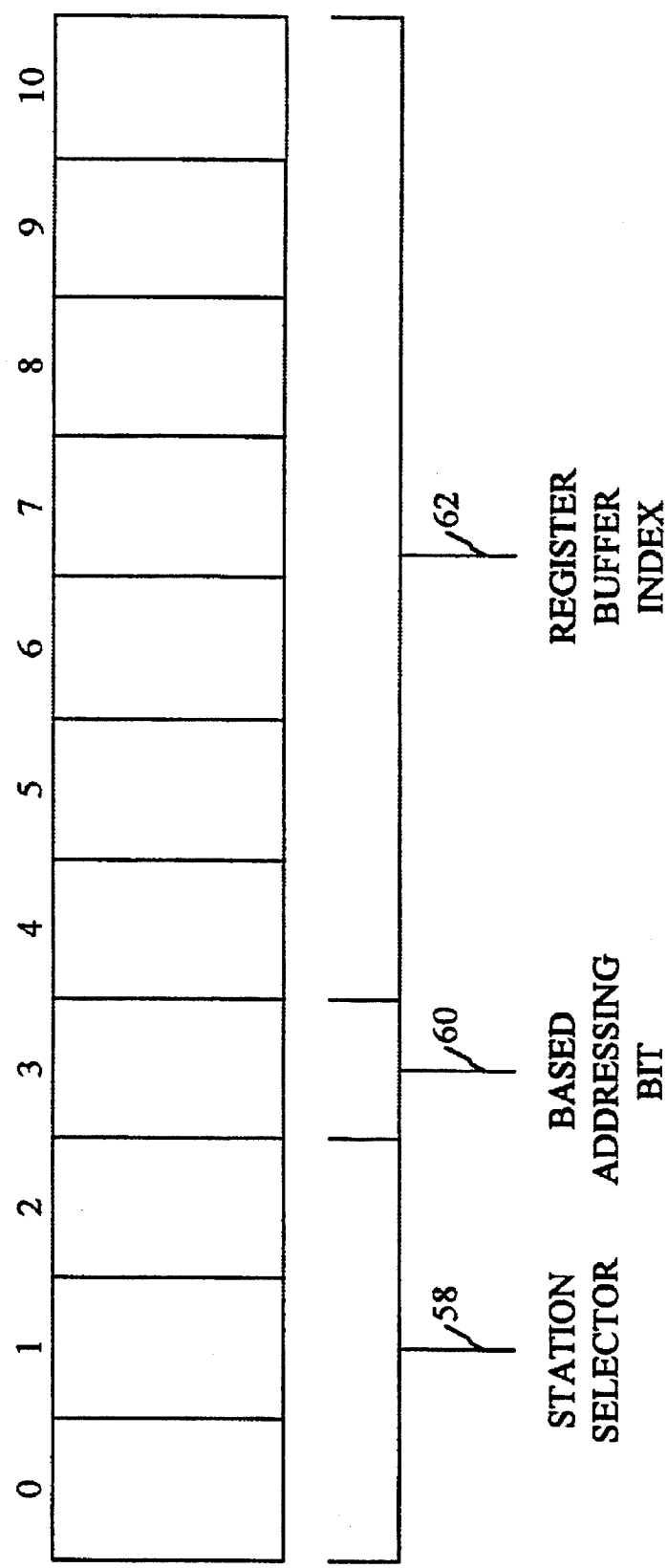
FIG. 4 shows the format of an Address for the Micro Bus.

FIG. 4 shows the format of an Address 44 for the Micro Bus 28. The Station Selector field 58, stored in bits 0–2, is used to address one of the eight Stations. The Based Addressing Bit field 60, stored in bit 3, is used to select one of two possible modes of operation: Direct addressing, when clear, or Based addressing, when set. Direct addressing is used to address registers and designators on a Station that do not have a particular addressing structure. Direct addressing allows for access to as many as 128 registers and/or designators if the station is designed to accommodate both Direct and Based addressing modes. If the Station does not have Based addressing mode, then up to 256 registers and/or designators can be addressed. Based addressing is used to reference register stacks, and allows addressing of buffers up to 128 registers deep. Since the Micro Bus 28 is either 32 or 36 bits wide, the number of possible addressable registers or designators on a Station could be as high as 2*N, where N is either 32 or 36 as applicable. The Register Buffer Index field 62, stored in bits 4–10, indicates which register or designator to reference within the selected Station.

2. Branch On External Condition Signals

Figure 5:
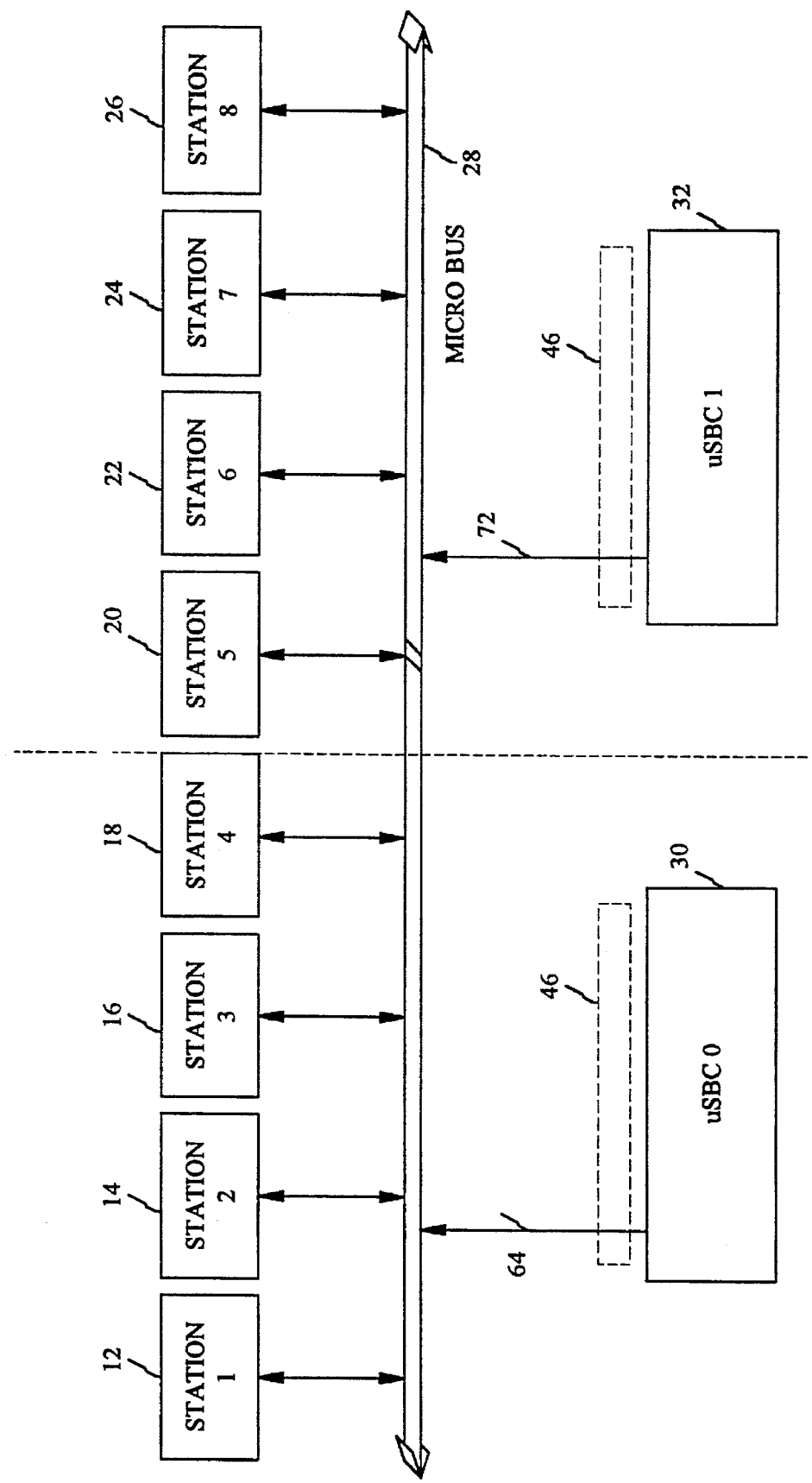
FIG. 5 is a block diagram illustrating the Branch On External Condition control signals that are output from the Microsequencer Bus Controllers to the Micro Bus.

FIG. 5 is a block diagram illustrating the Branch On External Condition control signals that are output from the Microsequencer Bus Controllers to the Micro Bus. There are two Branch On External Condition signals output from the uSBCs. USBC 0 30 drives Stations 1, 2, 3, and 4, labelled 12, 14, 16, and 18, respectively, with Branch On External Condition signal 64. USBC 1 32 ,drives Stations 5, 6, 7, and 8, labelled 20, 22, 24, and 26, respectively, with Branch On External Condition signal 72. The Branch On External Condition signal is generated by a uSBC when it executes a External Branch (BRCH) instruction, which tests the state of a designator located on a Station. The state of the designator tested is used to determine whether a branch is taken during the execution of the instruction system.

C. Signals From A Station To A uSBC

1. External Branch Condition Signals

Figure 6:
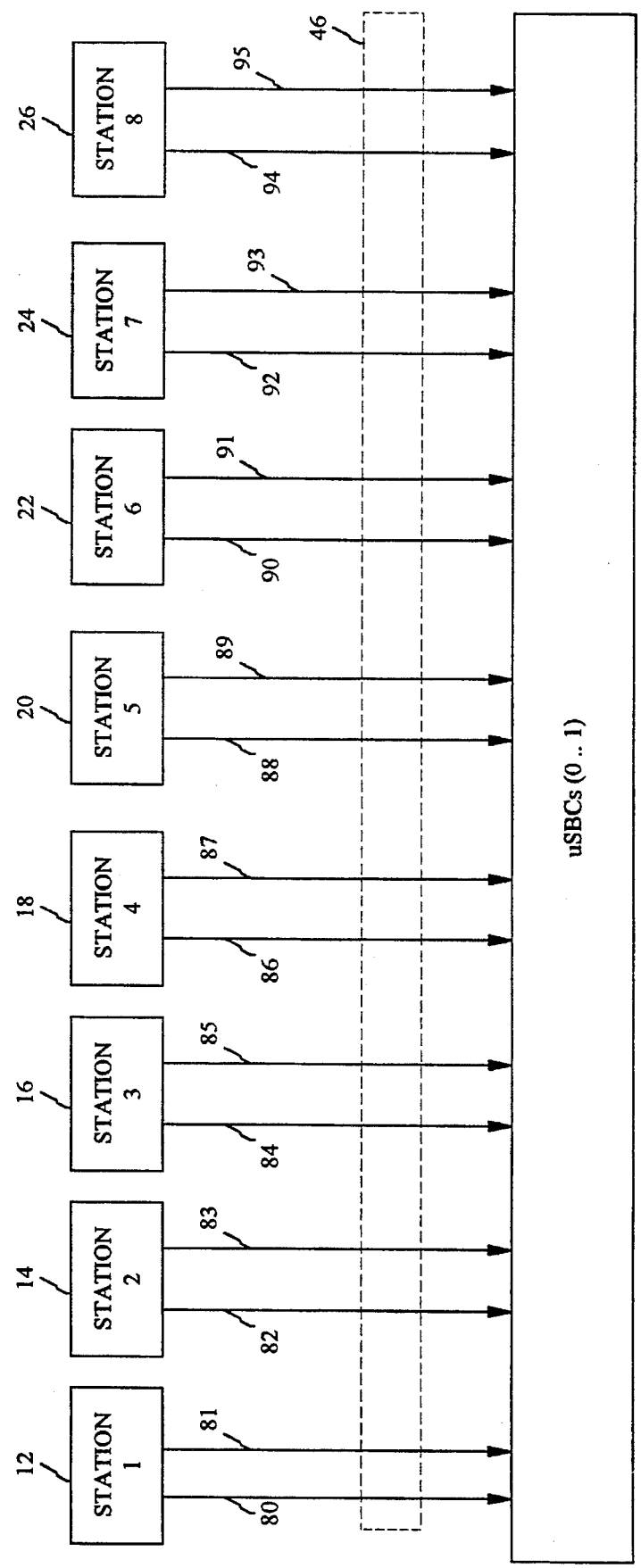
FIG. 6 is a block diagram illustrating the External Branch Condition and Continue control signals output from each Station to the Microsequencer Bus Controllers.

FIG. 6 is a block diagram illustrating the External Branch Condition and Continue control signals output from each Station to the Microsequencer Bus Controllers. Stations 12, 14, 16, 18, 20, 22, 24, and 26, output External Branch Condition signals 80, 82, 84, 86, 88, 90, 92, and 94, respectively. The External Branch Condition signal indicates the logic level of the external designator specified by the Address 54. If the addressed external designator is set, the External Branch Condition signal is a logic high, and if the addressed external designator is clear, the signal is a logic low. The External Branch Condition signal allows the uSBC to determine which path to take when the uSBC is executing a conditional External Branch instruction.

2. Continue Signals

FIG. 6 also shows eight Continue control signals. Each Station outputs a Continue signal, which is similar to an acknowledgement signal. Stations 12, 14, 16, 18, 20, 22, 24, and 26, output Continue signals 81, 83, 85, 87, 89, 91, 93, and 95, respectively. The Continue signal communicates to the uSBC requesting a function to be performed that the Station has received the request and is executing the request. The Continue signal is used to lock out other Station activity on the Micro Bus 28 while the selected Station performs the requested task. The uSBCs simultaneously monitor the Continue signals from each Station to detect erroneous signals, and the uSBCs will halt all operations upon detection of erroneous Continue signals.

III. The Control Store

Referring back to FIG. 1, the Control Store 34 is used to store the instructions that are executed by uSBC 0 30 and uSBC 1 32. These instructions are 44 bits wide. The Control Store 34, although in reality a RAM, is used as a read-only memory (ROM). A Control Store consists of seven SRAM chips. Each SRAM holds 32* 1024 (K) 8-bit bytes of data. Each unit of data stored in a Control Store consists of 44 bits of instruction, 8 bits of parity for the instruction, and 2 bits of address bit parity (one bit for even address drivers, one bit for odd address drivers). Since there are seven SRAMs, each holding 8 bits per byte, a total of 56 bits is available for storage of each storage unit if part of each storage unit is stored in each of the seven SRAMs.

The Control Store 34 is loaded with instructions at system initialization time. The parity bits and address bits are computed and appended to each instruction as it is stored. Later, as uSBC 0 30 and uSBC 1 32 are executing instructions, each instruction is fetched from the Control Store and parity values are computed from it. Each uSBC compares the parity values computed by it against the parity checks stored in the Control Store. If there are any discrepancies, the Control Store is assumed to be corrupted and an internal check condition is raised in the uSBC. This is a fatal error for uSBC processing. The error is reported to the MTCC 48 and processing is halted.

IV. The Microsequencer Bus Controller

The Microsequencer Bus Controller (uSBC) is a special purpose microprocessor that executes instructions to monitor and control the transfer of data within the Microsequencer Bus Controller System 10. Refer to FIG. 1. There are two uSBCs in the system to ensure that all data manipulations are verified with duplex checking. One is considered to be the master 30, and the other the slave 32. Only the master uSBC 30 drives the Data 42 on the Micro Bus 28, but both master and slave uSBCs drive Address 44 and Control 46 signals to lower the loading on the Micro Bus 28. The slave uSBC 32 sends the results of each instruction to the master uSBC 30 on a separate Line 40. The master uSBC then compares this value to the result it computed. If the values are different, an internal check error condition has occurred. This is a fatal error that is reported to the MTCC 48. The uSBC processing is halted because of the error. Notice that the uSBCs, although connected to the Micro Bus, are not considered to be Stations. Furthermore, the slave uSBC has its transmitters disabled, thus it can only receive Data 42 from the Micro Bus 28.

The uSBCs also interface with the MTCC 48 for initialization and maintenance functions, and clock circuitry to receive signals that control the sequential elements of the uSBC.

A. uSBC Architecture

Figure 7:
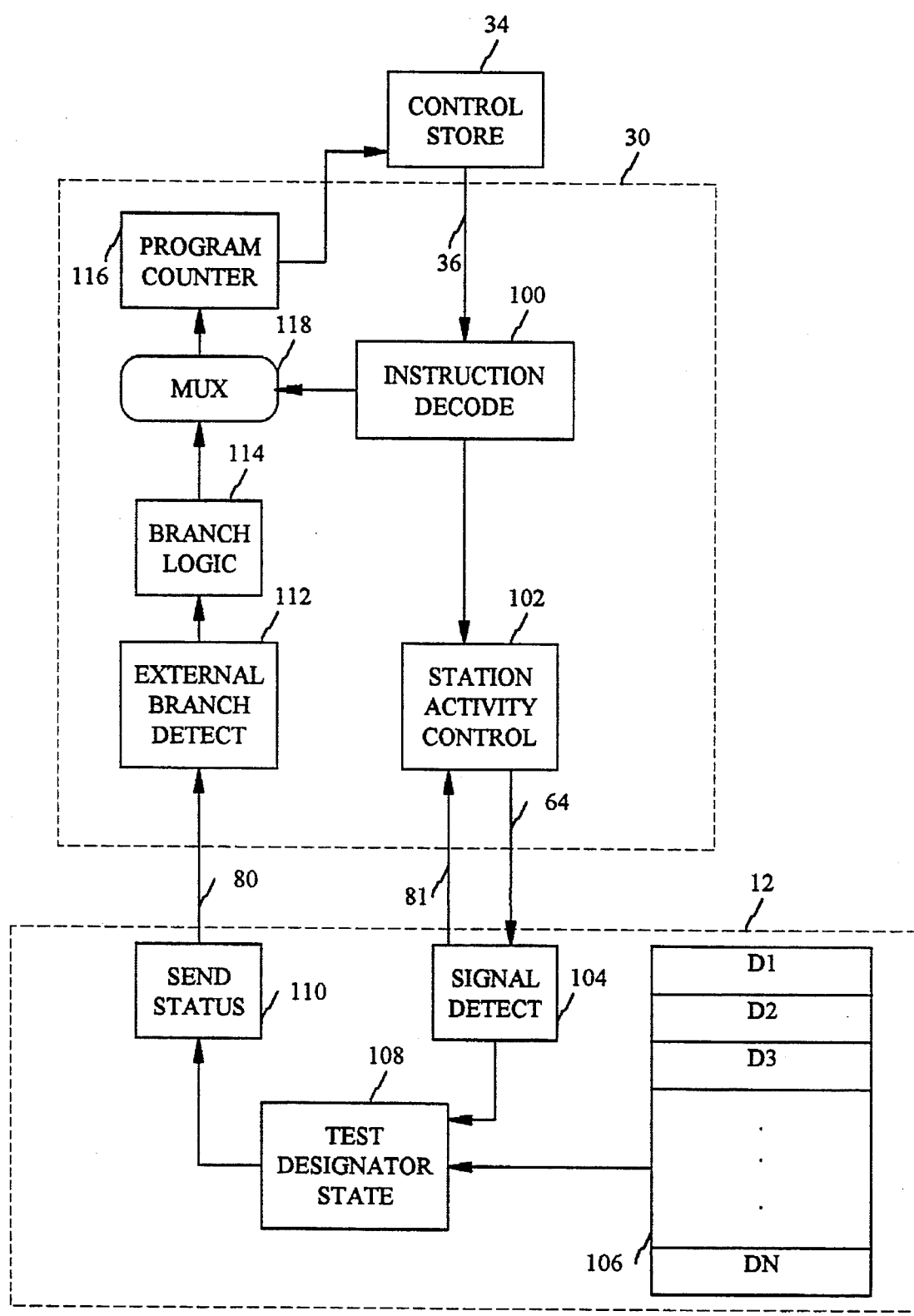
FIG. 7 is a block diagram of the main components of the Microsequencer Bus Controller and a Station that relate to External Branch instruction execution.

FIG. 7 is a block diagram of the main components of the Microsequencer Bus Controller and a Station that relate to External Branch instruction execution. The Instruction Decode logic 100 fetches instructions from the Control Store 34 and decodes the instruction to determine which command is requested, what operands the command is to be executed with, and which one of the Stations, if any, operands are to be fetched from or the result is to be written to. The result of the instruction decoding is forwarded to Station Activity Control logic 102, which controls the operation of the Micro Bus 28. For the External Branch instruction, the Branch On External Condition signal 64 is set, thereby notifying the Stations that an External Branch instruction is being processed. The uSBC decodes the Address 54 (shown on FIG. 3) to identify the Station that is active. The active Station 12 has Signal Detect logic 104 that detects the arrival of the Branch On External Condition signal. The Station sends back a Continue signal 81 to notify the uSBC that it has received the request. The Station 12 obtains the designator identifier from the Address 54 placed by the uSBC on the Micro Bus 28. The Test Designator State logic 108 retrieves the specified external designator value and the Send Status logic 110 forwards this information back to the uSBC by setting the External Branch Condition signal 80 either high or low, depending on the value of the external designator. The External Branch Condition signal 80 is detected by External Branch Detect logic 112. Branch Logic 114 determines the flow of instruction control by examining the External Branch Condition signal 80 received from Station 110, and the results of the Instruction Decode logic 100. The address of the next instruction to be fetched from the Control Store 34 is placed in the Program Counter 116 via Multiplexor (MUX) 118.

Figure 8A:
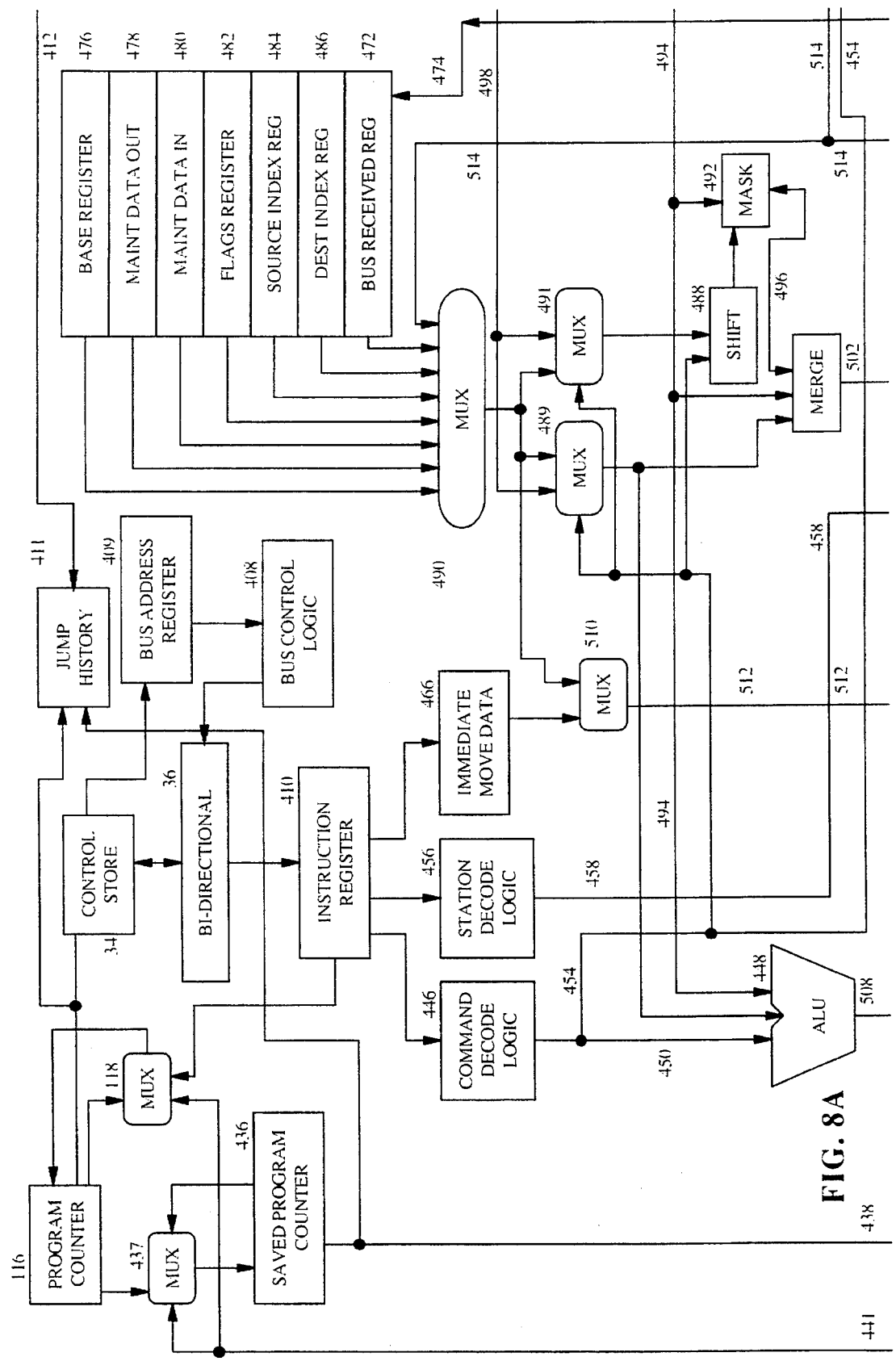
Figure 8B:
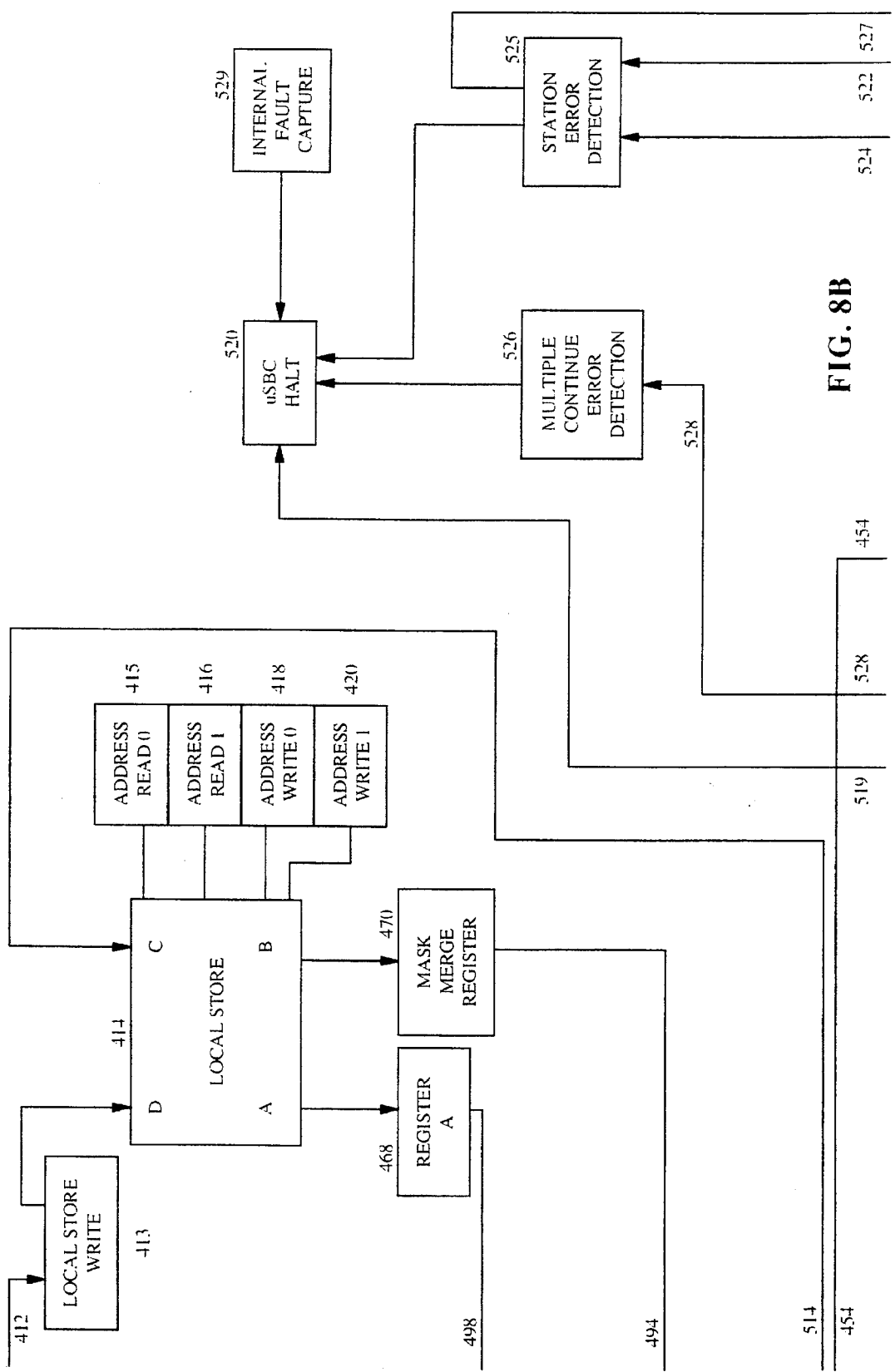
Figure 8D:
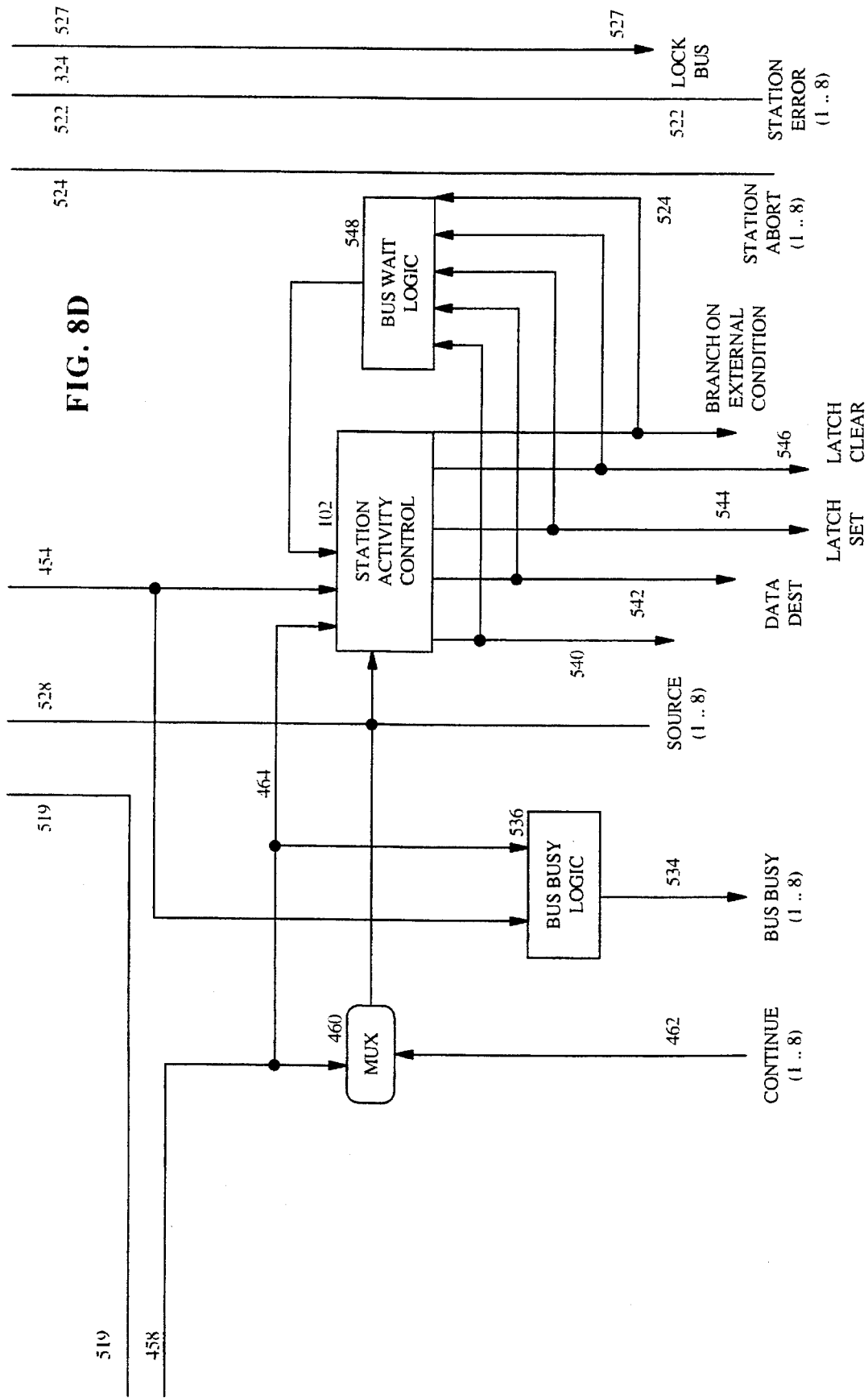

FIG. 8, comprising FIG. 8(A) through FIG. 8(D), is a detailed diagram illustrating the architecture of a Microsequencer Bus Controller. The Control Store 34 holds the instructions to be executed by the uSBC. The Control Store 34 is accessed by the uSBC via Bi-Directional Line 36, which is controlled by Bus Control Logic 408. The Bus Address Register 409 holds the address of the designator specified by the instruction, if any. The Program Counter 116 is a register that holds the address of the instruction to be fetched from the Control. Store 34. The instruction is retrieved from the indicated position in the Control Store 34 and stored in the Instruction Register 410 for subsequent processing. For most instructions, the Program Counter 116 is then incremented to address the next instruction in the Control Store to execute. Multiplexor (MUX) 118 controls the input to the Program Counter 116. Input is accepted from the Program Counter itself, the Instruction Register 410, and Branch Logic 114. The address in the Control Store where the instruction was fetched from is saved by the Jump History logic 411 in the Local Store Write Register (LSW0) 413 (see FIG. 8(B)) over Line 412 and subsequently written to the Local Store 414.

The Local Store 414 stores data internal to the uSBC for use in executing instructions. The Local Store 414 holds 1024 36-bit words. It is accessed by storing the address to read data from or write data to in one of four special purpose registers. These registers are the Address Read 0 415, Address Read 1 416, Address Write 0 418, and Address Write 1 420. The Local Store 414 is implemented as a four port RAM cell. The four port RAM cell provides the capability of concurrent access to the memory via two read ports and two write ports.

Referring back to FIG. 8(A), the Saved Program Counter 436 is a register holding the address in the Control Store 34 where the current instruction to be executed is stored. It is loaded with a value selected by MUX 437 from the current Program Counter 116, the current Saved Program Counter 436, or the output of Branch Logic 114 over Line 441. The Saved Program Counter 436 is also stored in the Local Store 414 by Jump History logic 408. The contents of the Saved Program Counter 436 are also forwarded to MUX 504 over Line 438.

When the current instruction is a branch instruction, Branch Logic 114 (see FIG. 8(C)) determines if the branch condition has been satisfied and if it has, then Branch Logic 114 forwards the address of the instruction to be branched to over Line 441 to MUX 118 for subsequent storage in the Program Counter 116. This causes the next instruction fetched to be the instruction stored at the branch address rather than the next sequential instruction. Evaluation of the branch condition includes reading the External Branch Condition signal 80 via External Branch Detection logic 112 if the branch instruction is an External Branch instruction. It includes accepting input from the Internal Branch Detection logic 445 if the branch instruction is an Internal Branch instruction. It also includes accepting input from the Accumulator 442 if the branch instruction is a Table Branch instruction.

The instruction stored in the Instruction Register 410 is processed by two sets of logic. The Command Decode Logic 446 determines what kind of command is indicated by the instruction and forwards data and control information contained in the instruction to the Arithmetic Logic Unit (ALU) 448 over Line 450 and to the Station Activity Control logic 102 (shown on FIG. 8(D)) over Line 454. The Station Decode Logic 456 determines which Station is to be referenced by the instruction, if necessary. The Station identification information obtained by the Station Decode Logic 456 is forwarded over Line 458 to MUX 460. This Station identification information is used to select which Continue signal (1 through 8) 462 (shown on FIG. 8(D)) activation is expected as a result of the execution of the current instruction. The Station Decode Logic 456 also forwards the Station identification information directly to the Station Activity Control logic 102 over Line 464.

The Immediate Move Data register 466 (shown on FIG. 8(A)) holds the data to be transferred to a uSBC internal register, an external register, or to the Local Store 414. The Immediate Move Data 466 is obtained from the instruction stored in the Instruction Register 410.

The uSBC contains various internal registers used during processing of instructions. Operand data for an instruction is read out of the Local Store 414 and stored in general purpose Register A (REGA) 468 (see FIG. 8(B)). A mask/merge bit pattern for manipulating operand data is read out of the Local Store 414 and stored in the Mask/Merge Register (MMRG) 470. The Bus Receive Register (BUSR) 472 (see FIG. 8(A)) is a 36-bit register that holds data, received from the Micro Bus over Line 474, resulting from an external read. It is the only uSBC register that can be written by the Micro Bus 28. During the execution of a operation to read a register on a station external to the uSBC, the resulting data is put into the BUSR 472. It can then be moved to the Local Store 414 or used as an operand for an instruction. The Accumulator (ACC) 442 (see FIG. 8(C)) is a 36-bit register that holds the results of the ALU 448 after execution of an instruction. It is the only register that can output data from the uSBC to the Micro Bus 28. Therefore, every write of an external register or designator uses the ACC 442.

There are six other special purpose registers used by the uSBC. The Local Store Base Register (LSBR) 476 is a six bit register used for Based addressing of the Local Store 414. If Based addressing is selected, the uSBC uses the contents of LSBR 476 as the six most significant bits of the 10-bit Local Store address, and obtains the four least significant bits from the instruction. Instructions use Based addressing to access the ACB Buffers (not shown) within the Local Store 414. The Maintenance Data Out Register (MDOR) 478 is used to report non-fatal errors. The Maintenance Data In Register (MDIR) 480 is a 32-bit dynamic scan/set register under the control of the Maintenance processing of the system via the MTCC 48. The MDIR is used by Maintenance to send messages to the uSBC.

The Flags Register (FLGR) 482 is a hardware flags register. It contains 16bits which are individually tested, set, and cleared. Any number of these flags can be set/cleared in one instruction. The flags are also used as branch condition indicators. The Source Index Register (SIXR) 484 and the Destination Index Register (DIXR) 486 are 14-bit registers used for indexing external registers and as internal loop counters. The SIXR 484 is used for indexing read requests from Local Store 414, and DIXR 486 is used for indexing write requests to Local Store 414. These registers can be automatically incremented as part of the execution of many instructions. Thus they are useful and efficient loop counters.

The uSBC contains two main processing groups of logic. The Shift/Mask/Merge unit performs all shift operations, as well as masking and merging of operands. Shift logic 488 selects the contents of one of the registers described above as input dam via MUX 490 and MUX 491 as shown. Control of the shift, such as shift direction and length, is obtained from the Command Decode logic 446. The results of the Shift operation are forwarded to Mask logic 492. The Mask logic 492 also obtains input data representing a mask bit pattern from the MMRG register 470 over Line 494. Results of the Mask logic 492 are forwarded to Merge logic 496. Merge logic 496 also accepts input data representing an address in the Local Store 414 from REGA 468 over Line 498 or from one of the internal registers multiplexed by MUX 489. Merge logic 496 obtains a merge bit pattern from the MMRG register 470 over Line 494. The results of the Shift/Mask/Merge operation are forwarded via Line 502 and MUX 504 to the Accumulator 442.

The ALU 448 performs all arithmetic and logical operations. It processes either 32-bit or 36-bit data words. The ALU 448 selects operand data from one of the internal registers and REGA 468 via MUX 489, or MMRG 470 over Line 494. It also obtains command information from the Command Decode Logic 446 via Line 450. The result of the arithmetic or logical operation is stored in the Accumulator 442 (see FIG. 8(C)) via MUX 504 and Line 508.

The Accumulator 442 selects data to store via MUX 504 from four possible sources. The first source is the Saved Program Counter 436 which forwards data over Line 438. The data from the Saved Program Counter 436 represents the address of the instruction being executed. The second source is the output from the ALU 448 over Line 508. The third source is MUX 510 which forwards Immediate Move Data from an instruction or data from one of the internal registers over Line 512. The fourth source is the output from the Shift/Mask/Merge logic grouping over Line 502.

The contents of the Accumulator 442 may be selected by MUX 490 as an operand for the execution of a subsequent instruction via Line 514. The contents of the Accumulator 442 are also stored in the Local Store 414 via Line 514. The contents of the Accumulator 442 may also be written to a register on a Station connected to the Micro Bus 28. Bus Control Logic 516 controls transfers over the bidirectional Micro Bus 28.

If the uSBC is a slave uSBC, then the contents of the Accumulator 442 are forwarded over Line 230 to the master uSBC for comparison with the result stored in the master uSBC's Accumulator. Checker logic 518 compares the two values and indicates a fatal error to the uSBC Halt logic 520 (see FIG. 8(B)) if the two values are not equal. The uSBC Halt logic 520 then stops the microprocessor. Processing is also halted if an error indication is received from one of the Stations via a Station Error 522 or Station Abort 524 signal. These signals are processed by Station Error Detection logic 525 and a error indication is forwarded to uSBC Halt logic 520. A Lock Bus signal 324 is then sent out to notify the other Stations that there is a problem. Multiple Continue Error Detection logic 526 detects errors relating to multiple Continue signals being received by the uSBC from MUX 460 over Line 528. If such an error occurs, the uSBC Halt logic 520 stops the microprocessor. Finally, if an internal fault occurs, Internal Fault Capture logic 529 detects the error and notifies the uSBC Halt logic 520.

Data may be received over the Micro Bus 28 in either full-word or half-word modes. In full-word mode, the data consists of either 32 or 36 bits, depending on the mode setting of the uSBC. In half-word mode, the data consists of either 16 or 18 bits, again depending on the mode setting of the uSBC. The data received over the Micro Bus 28 is stored in the Bus Received Register 472 after being selected by MUX 530 depending on the setting of the Half Word signal 532. If the Haft Word signal is present, then the lower half of the bits in the data sent to the Bus Received Register 472 is zeroed out.

The uSBC informs the Stations that it is transmitting data over the Micro Bus 28 by manipulating the Bus Busy lines 534. Bus Busy Logic 536 accepts as input command information from the Command Decode Logic 446 over Line 454 and Station identification information from the Station Decode Logic 456 over Line 458. The Bus Busy Logic 536 sets the corresponding Bus Busy line to high when the uSBC is transferring data from the Accumulator 442 over the Micro Bus 28 to that particular Station.

High level functional control of the Micro Bus 28 is managed by the Station Activity Control logic 102. Station Activity Control 102 implements the uSBC/Station communication protocol by setting and clearing the eight Source signals 540, four of the eight Data Destinate signals 542, four of the eight Branch On External Condition signals 64, the Latch Set signal 544, and the Latch Clear signal 546. Bus Wait Logic 548 ensures that Station Activity Control 102 does not attempt to access the Micro Bus 28 if it is not available for data transfers.

V. External Branch Instruction

One of the instructions contained in the instruction set of the uSBC is the External Branch instruction. The External Branch instruction is used to change the execution sequence of instructions in an instruction stream by evaluating a condition which is stored in an external designator on a Station. Thus, the storage location of the branch condition is external to the microprocessor. This capability allows the uSBC to test an event on a Station to determine program control.

Figure 9:
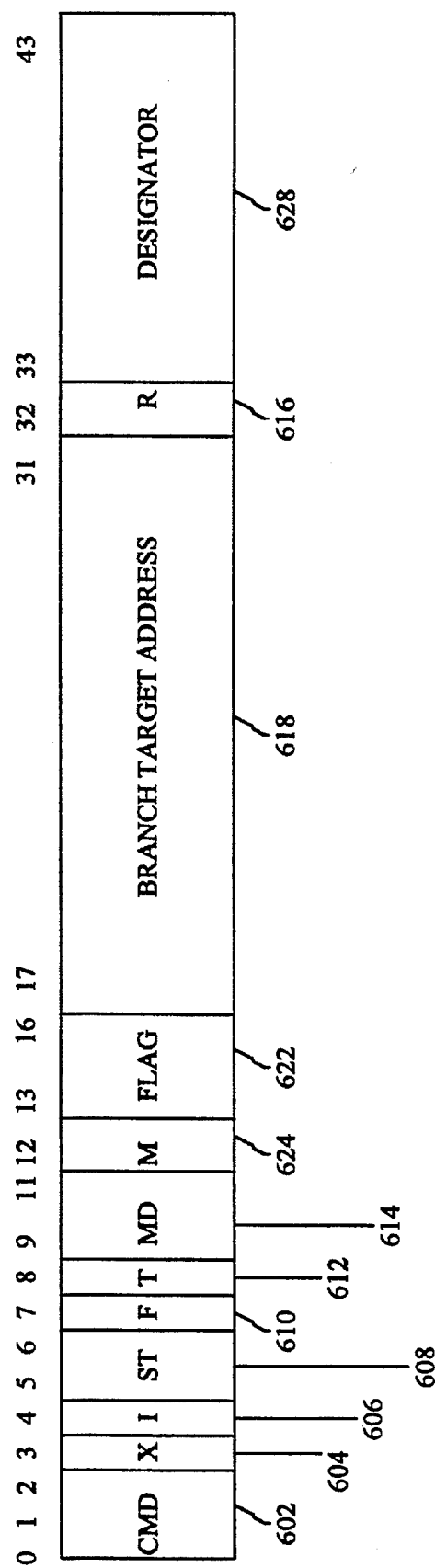
FIG. 9 shows the format of an External Branch instruction.

FIG. 9 shows the format of an External Branch instruction. The CMD field (bits 0–2) 602, when equal to six, specifies that this is a branch instruction. The X field (bit 3) 604, when set, indicates that the indexed addressing mode is selected. The I field (bit 4) 606, when set, causes the SIXR 484 to be incremented by one after all data references for this instruction are complete. The ST field (bits 5–6) 608 controls the Call/Return Stack (stored in the Local Store 414) during a branch instruction. If the ST field 608 is one and the branch condition is evaluated as true, then processing of this instruction includes popping an address off the Call/Return Stack. If the ST field 608 is two and the branch condition is evaluated as true, then processing of this instruction includes resetting the Call/Return Stack. If the ST field 608 is three, then no entry is to be made in the Jump History Table (stored in the Local Store 414).

The Branch Condition Indicator "F" field (bit 7) 610 indicates whether the branch will take place on a true value (F=0) or a false value (F=1). The T field (bit 8) 612, when set, indicates that a Table Branch instruction, not an External Branch instruction, is to be executed. The MD field (bits 9–11)614 specifies the mode of operation for the branch instruction. The R field (bit 32) 616 selects either BUSR 472 (when R=0) or ACC 442 (when R=1) as an input register for this instruction. If the T field 612 is clear, then the instruction is either an Internal Branch or an External Branch. The MD field 614 specifies whether the branch is internal (when MD=0) or external (when MD=4). When the branch is internal or external, the Branch Target Address field (bits 17–31) 618 specifies a branch target address in the Control Store 34 where the next instruction is to be fetched from, if the branch condition is satisfied. The Designator field (bits 33–43) 628 specifies an external designator resident on a Station which holds the value to be evaluated for the branch condition.

The External Branch instruction is different from ordinary branch instructions in that it uses a status external to the uSBC (a value stored in a designator on a Station) to determine whether the branch should be taken.. The uSBC accesses this external status indicator to obtain and evaluate the branch condition in parallel with other steps being performed for the branch instruction, rather than fetching the value over the Micro Bus 28 and then evaluating it. The uSBC initiates an external test of the designator resident on the Station specified by the Destination field 628 of the External Branch instruction. This signal is transmitted as the Branch On External Condition signal 64 to all Stations. The Stations then decode the Address 54. While this request is being performed, the uSBC gets the address of the next sequential instruction in Control Store 34 memory and stores it, assuming that the branch may not be taken. The uSBC also reads the branch target address specified by the Control Store Address 618 field of the External Branch instruction. When the condition of the designator arrives over the External Branch signal 80, the Branch Logic 114 uses either the next sequential address or the branch target address, depending on the value of the condition specified by the designator, to transfer control for execution of the next instruction. Because the external designator test and address fetching are done in parallel, the execution time for this instruction is minimized.

Figure 10:
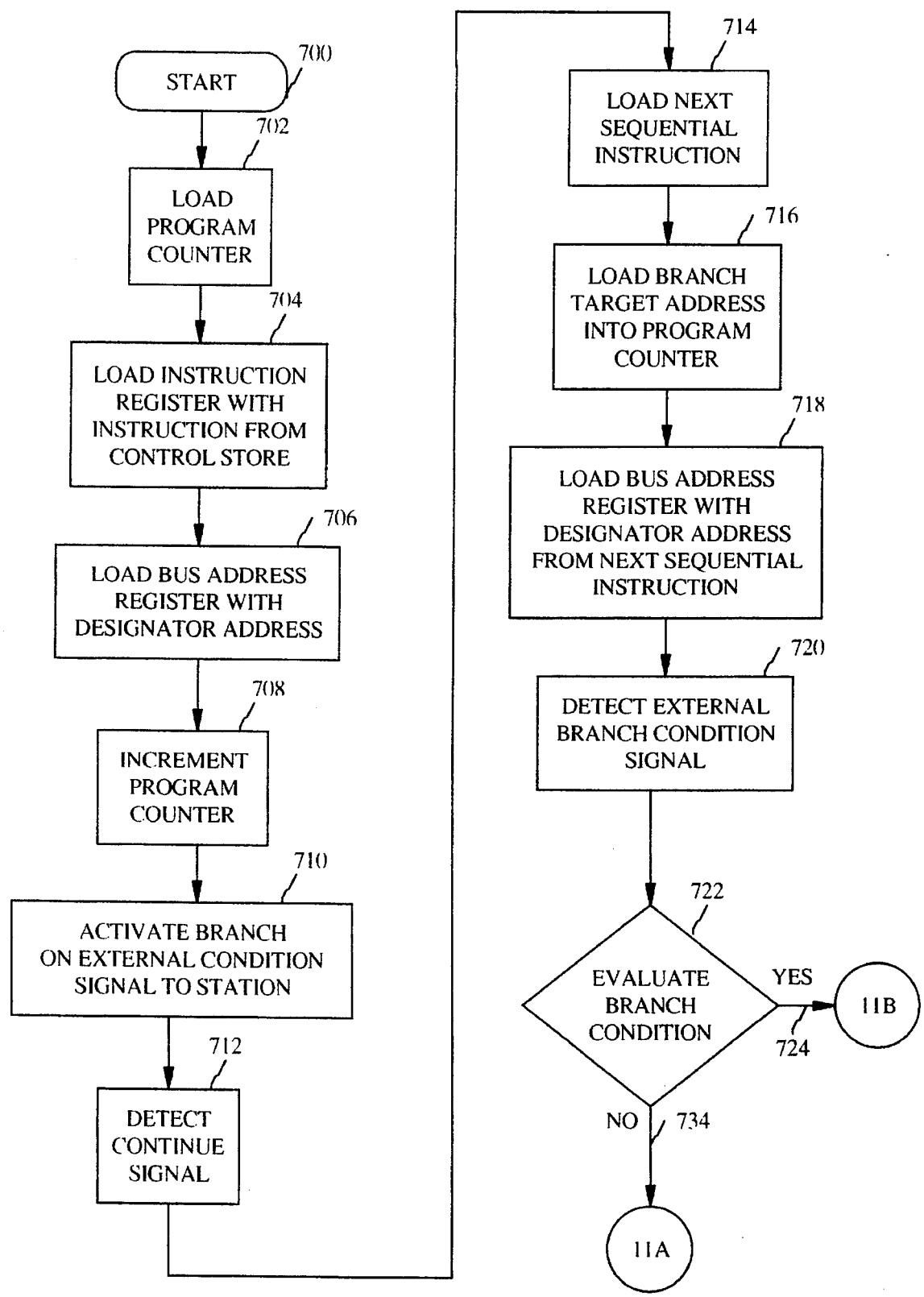
FIG. 10 and FIG. 11 are flow charts illustrating the processing steps performed in executing an External Branch instruction.
Figure 11:
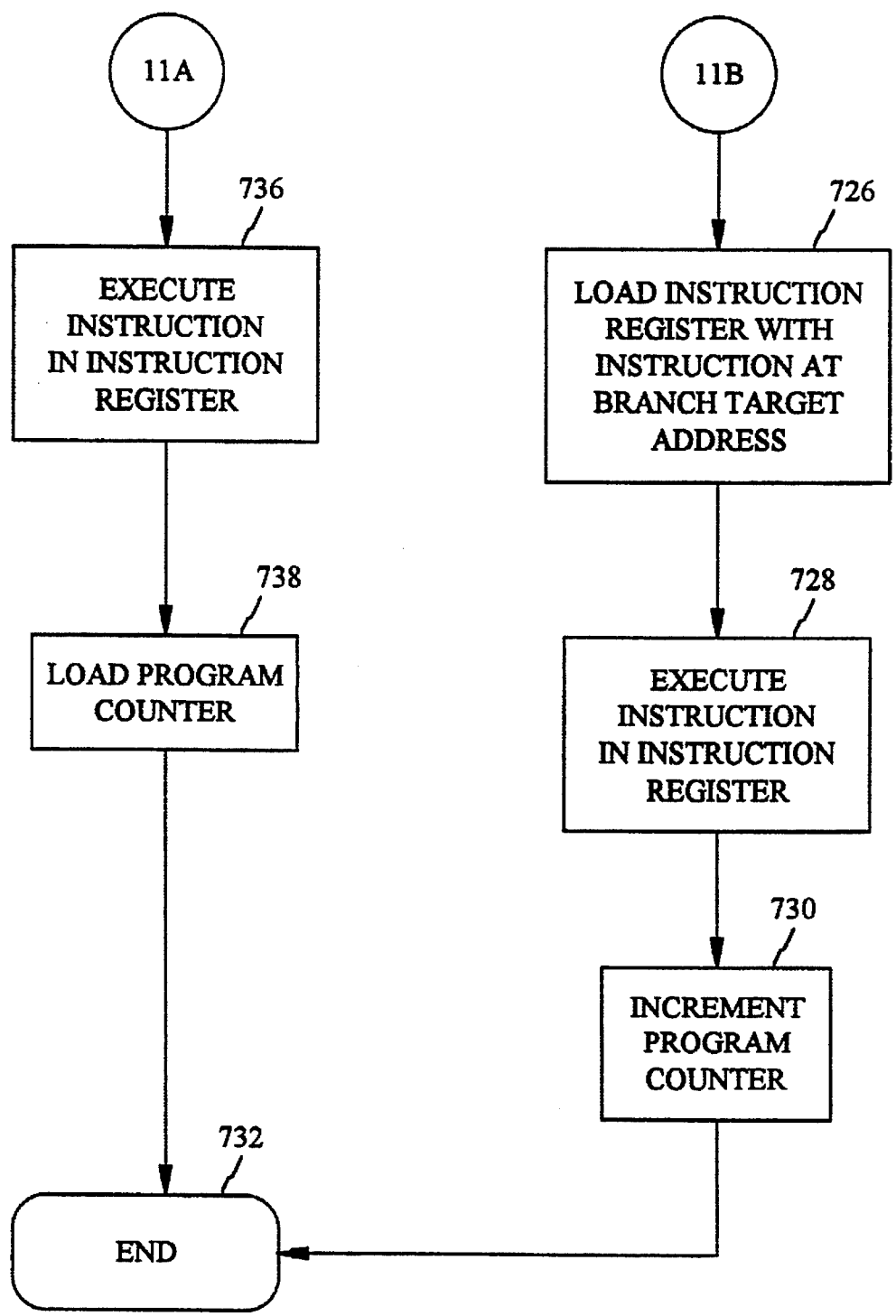

FIG. 10 and FIG. 11 are flow charts illustrating the processing steps performed in executing an External Branch instruction. Processing of the External Branch instruction commences with the Start step 700. At Step 702 the uSBC loads the Program Counter 116 with the address of the instruction to be performed. Next, at Step 704 the uSBC loads the Instruction Register 410 with the instruction fetched from the Control Store 34 at the address pointed to by the Program Counter 116. In parallel with the loading of the instruction, at Step 706, the uSBC loads the Bus Address Register 409 with the value contained in the Designator field 628 of the current instruction. The uSBC then increments the Program Counter 116 at Step 708 to prepare for the fetching of the next sequential instruction. At Step 710, the uSBC activates the appropriate Branch On External Condition signal 64 to notify the Station selected as part of the Designator field 628 that an External Branch instruction is being performed. When the Station detects the Branch On External Condition signal, it responds with a Continue signal which is detected by the uSBC at Step 712.

Next, the uSBC loads the next sequential instruction into the Instruction Register 410 at Step 714. Recall that the Program Counter 116 is already contains the Address of this instruction. This pre-fetching of the next sequential instruction is performed so that if the branch is not taken, the instruction is immediately ready to execute. The uSBC then loads the Branch Target Address 618, obtained from the current instruction, into the Program Counter 116 at Step 716, thereby setting up the Program Counter for the fetching of the next instruction if the branch is taken. At Step 718, the uSBC loads the Bus Address Register 409 with the Designator field 628 of the next sequential instruction (which is now in the Instruction Register 410).

When the uSBC detects the arrival of the External Branch Condition signal 80 from the selected Station 12 at Step 720, it then ready to evaluate the branch condition. The uSBC evaluates the branch condition at Step 722 by comparing the state of the External Branch Condition signal 80 with the Branch Condition Indicator "F" field 610 of the External Branch instruction. If the F field 610 is zero and the state of the External Branch signal 80 is high or if the F field 610 is one and the state of the External Branch signal 80 is low, then the Yes path 724 is taken because the branch condition is valid. Step 726 on FIG. 11 is then performed to load the Instruction Register 410 with the instruction from the Control Store 34 addressed by the Branch Target Address (contained in the Program Counter 116). A change in instruction sequence control has thus been performed and the uSBC at Step 728 executes the instruction currently in the Instruction Register 410. The Program Counter 116 is incremented (Step 730) and processing ends at Step 732.

Referring back to FIG. 10 at Step 722, if the F field 610 is zero and the state of the External Branch Condition signal 80 is low or if the F field 610 is one and the state of the External Branch Condition signal 80 is high, then the No path 734 is taken because the branch condition is invalid. Step 736 is then performed to execute the instruction that has previously been fetched into the Instruction Counter 410. The Program Counter 738 is then reloaded (Step 738) to restore the correct address. This address will be the address following the address of the External Branch instruction (i.e., the result of Step 708 plus one). Processing then ends at Step 732.

Figure 12:
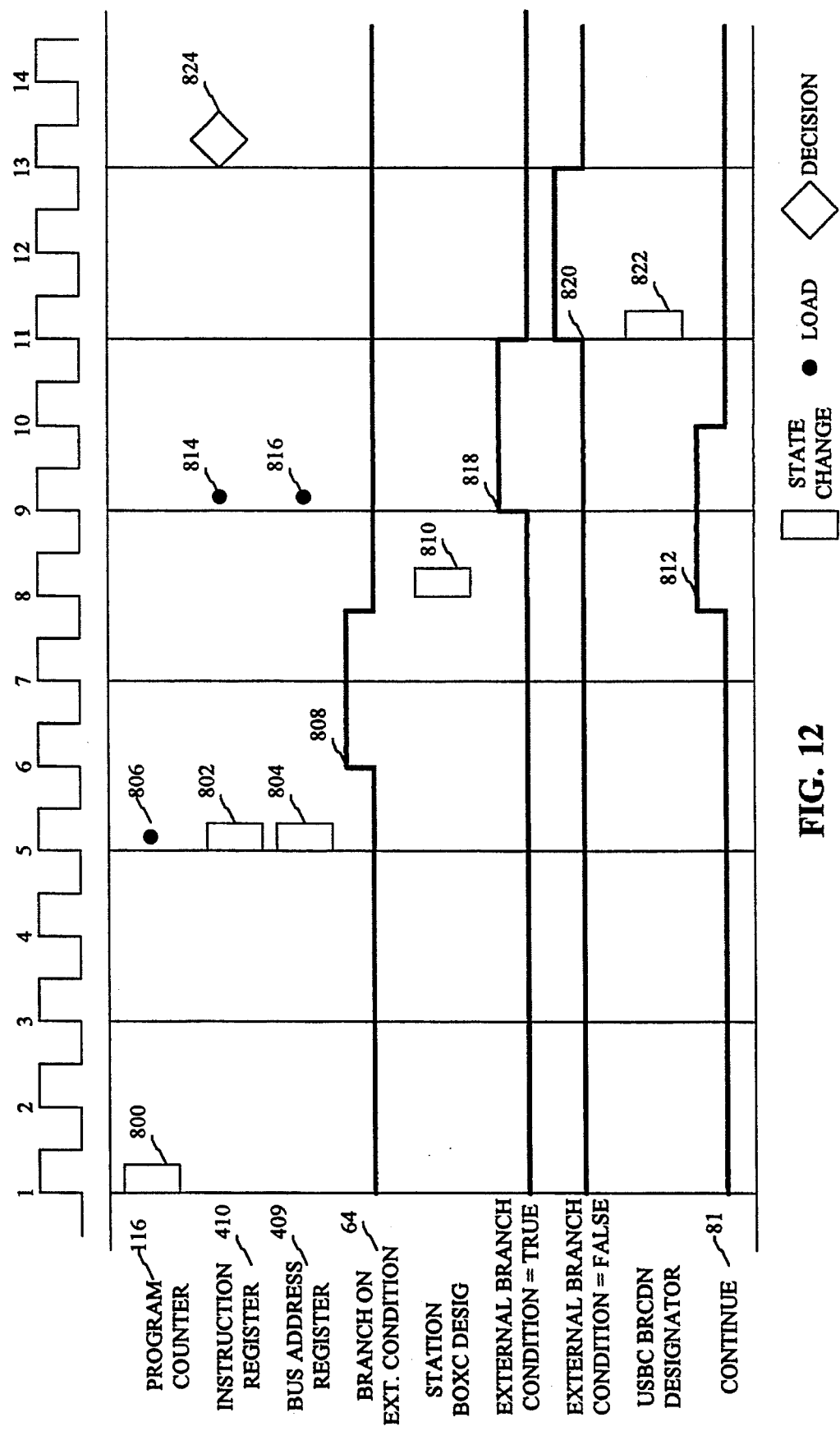
FIG. 12 is a timing diagram of the processing of the External Branch instruction.

FIG. 12 is a timing diagram of the processing of the External Branch instruction. Clock cycles from one through 14 are shown along the horizontal axis. Relevant registers and signals are shown along the vertical axis. At clock cycle one, the Program Counter 116 is loaded with the address of the External Branch instruction (Event 800). At clock cycle five, the instruction is loaded into the Instruction Register 410 (Event 802), the Bus Address Register 409 is loaded with the Designator identifier (Event 804), and the Program Counter 116 is incremented (Event 806). At clock cycle six, the uSBC activates the Branch on External Condition :signal 64 for a duration of two clock cycles (Event 808).

At clock cycle eight, the Branch on External Condition signal 64 is detected by the Station 12 and latched into a Branch On External Condition designator (Event 810). The Station then activates the Continue signal 81 for a duration of two clock cycles (Event 812). At clock cycle nine, the Instruction Register 410 is loaded with the next sequential instruction (Event 814), and the Bus Address Register 409 is loaded with the Designator identifier from that instruction (Event 816). These actions are taken to prepare the next sequential instruction for execution if the branch is not taken.

The External Branch Condition signal communicates the state of the designator to the uSBC. Instead of simply setting the state of the signal to a logic high for True and a logic low for False, the Station changes the state of the signal for a specified period of time. Thus, a signal pulse rather than a signal level is used to communicate the state information. The use of the signal pulse provides the capability to detect the stuck fault. If the External Branch Condition is true, the Station activates the External Branch Condition signal 80 for a duration of two clock cycles starting at clock cycle nine (Event 818). If the External Branch Condition is false, the Station activates the External Branch Condition signal 80 for a duration of two clock cycles starting at clock cycle 11 (Event 820). The uSBC then can detect which state is present on the signal and latches the state into a Branch Condition designator at clock cycle 11 (Event 822). Finally, the branch evaluation is performed and a decision is made at clock cycle 13 whether to branch or not to branch (Event 824).

It is critical that the External Branch Condition signal pulses occur during the clock cycles specified above and in FIG. 12. Any departure from this scheme will be considered an error condition by the uSBC. If the External Branch Condition is True, the signal pulse must start one clock cycle after the Station activates the Continue signal pulse. If the External Branch Condition is False, the signal pulse must start three clock cycles after the Station activates the Condition signal pulse. The pulses must last exactly two clock cycles. If the External Branch Condition signal is stuck logic high or logic low, then the signal pulse will not be received as expected and an error will be detected by the uSBC. In this way, a stuck fault on the branch condition signal line is always detected.

The foregoing method saves an input pin on the uSBC for each Station because one line is used to effectively transmit the branch condition rather than two lines. Thus, a total of only eight input lines are needed to communicate the External Branch Condition signals rather than 16 lines.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for communicating the state of a designator stored on an external device to a processor over a signal line, and for detecting stuck faults in the signal line, comprising the steps of:
  (a) providing a request from the processor to the external device to return the state of the designator,
  (b) sending a signal from the external device to the processor acknowledging receipt of said request,
  (c) reading the state of the designator by the external device,
  (d) sending a true condition signal pulse representing the state of the designator with a first continuous predetermined width from the external device to the processor over the signal line, commencing a first predetermined time after sending of said acknowledgment signal if said state of the designator is true,
  (e) sending a false condition signal pulse representing the state of the designator with a second continuous predetermined width from the external device to the processor over the signal line, commencing a second predetermined time after sending of said acknowledgment signal if said state of the designator is false,
  (f) sensing the state of the signal line by the processor, commencing with the receipt of said acknowledgment signal for a duration of a predetermined sensing time, and
  (g) detecting said true condition signal pulse, or said false condition signal pulse, or absence of a signal pulse, during said predetermined sensing time.

2. A system for communicating the state of a designator over a signal line and for detection of stuck faults occurring in the signal line, comprising:
  a processor, coupled to the signal line, comprising:
    requesting means for requesting the state of a selected designator, and
    detecting means for detecting signal pulses and absence of signal pulses on the signal line and for interpreting said signal pulses as true or false states of said selected designator, or said absence of signal pulses as stuck faults, and
  an external device, comprising:
    a plurality of designators, each of said designators having a state of either true or false;
    receiving means, coupled to said requesting means, for receiving said request from said processor,
    first sending means, coupled to said receiving means, for sending a signal to said processor acknowledging the receipt of said request,
    obtaining means, coupled to said receiving means, for obtaining said state of said selected designator, and
    second sending means, coupled to said obtaining means and said detecting means, for sending a signal pulse of a continuous predetermined width at a predetermined time after sending said acknowledgment signal to said processor over the signal line, said signal pulse being of a first continuous predetermined width and a first predetermined time when the state of said selected designator is true and said Signal pulse being of a second continuous predetermined width and a second predetermined time when the state of said selected designator is false.

3. A system for communicating a boolean value between processors of the system and for detecting stuck faults occurring during such communication, comprising:
  a signal request line;
  an acknowledgment line;
  a signal line;
  a first processor comprising:
    requesting means coupled to said signal request line and said acknowledgment line for sending a request to return a boolean value by activating said signal request line, and for receiving an acknowledgment on said acknowledgment line, and
    detecting means coupled to said signal line for detecting signal pulses and absence of signal pulses on said signal line and for interpreting said signal pulses as true or false boolean values, or said absence of signal pulses as stuck faults; and
  a second processor comprising:
    a plurality of designators, each of said designators having a boolean value of either true or false;
    receiving means coupled to said signal request line for receiving said request from said first processor,
    first sending means, coupled to said receiving means and said acknowledgment line, for sending an acknowledgment signal to said first processor acknowledging the receipt of said request by activating said acknowledgment line,
    obtaining means, coupled to said receiving means and said plurality of designators, for obtaining the boolean value of a selected designator, and
    second sending means, coupled to said obtaining means and said signal line, for sending on said signal line a signal pulse of a continuous predetermined width at a predetermined time after said acknowledgment signal is sent to said first processor, said signal pulse being of a first continuous predetermined width and a first predetermined time when the state of said selected designator is true and said signal pulse being of a second continuous predetermined width and a second predetermined time when the state of said selected designator is false.

4. The system of claim 3, further including address bus means coupled to said first processor and said second processor for communicating an address of said selected designator from said first processor to said second processor.

5. A system for communicating boolean branch condition values between processing elements of the system and for detecting stuck faults occurring during such communication, comprising:
  a branch on external condition line;
  a continue line;
  an external branch condition line;
  a processor comprising:
    request logic coupled to said branch on external condition line and said continue line, to send a request to return a boolean value by activating said branch on external condition line, and
    external branch detect logic coupled to said external branch condition line to detect signal pulses and absence of signal pulses on said external branch condition line and to interpret said signal pulses as true or false branch conditions, or said absence of signal pulses as stuck faults;
  an address bus coupled to said processor; and
  at least one gate array coupled to said address bus comprising:
    a plurality of designators representing branch conditions, each of said designators having a boolean value of either true or false;
    signal detect logic coupled to said branch on external condition line, said continue line, and said address bus, to receive said request from said processor and send an acknowledgment signal to said processor acknowledging receipt of said request by activating said continue line;

test designator state logic, coupled to said signal detect logic and said plurality of designators, to obtain the boolean value of a designator selected by said address bus, and send status logic, coupled to said test designator state logic and said external branch condition line, to send on said external branch condition line a signal pulse of a continuous predetermined width at a predetermined time after said acknowledgment signal is sent to said processor, said signal pulse being of a first continuous predetermined width and a first predetermined time when the state of said selected designator is true and said signal pulse being of a second continuous predetermined width and a second predetermined time when the state of said selected designator is false.

6. In a system having at least two processors, the processors being connected by a signal request line, an acknowledgment line, a signal line, and an address bus, a processor having a plurality of designators, each designator storing a boolean value, a method for communicating a boolean value of a selected designator from a first processor to a second processor over the signal line and for detecting stuck faults in the signal line comprising the steps of:

(a) placing the address of a selected designator on the address bus;

(b) activating the signal request line;

(c) activating the acknowledgment line in response to the activated signal request line;

(d) reading the boolean value stored in the selected designator addressed by the address bus;

(e) sending a true condition signal pulse with a first continuous predetermined width over the signal line, said true condition signal pulse representing the boolean value of the selected designator, commencing a first predetermined time after activation of the acknowledgment line if the boolean value of the selected designator is true;

(f) sending a false condition signal pulse with a second continuous predetermined width over the signal line, said false condition signal pulse :representing the: boolean value of the selected designator, commencing a second predetermined time after activation of the acknowledgment line if the boolean value of the selected designator is false;

(g) sensing the state of the signal line, commencing with the sensing of the activation of the acknowledgment line, for a duration of a predetermined sensing time;

(h) detecting said true condition signal pulse, or said false condition signal pulse, or absence of a signal pulse, during said predetermined sensing time; and (i) interpreting said absence of a signal pulse as a stuck fault.

* * * * *